COLOR SYNCHRONIZATION FOR TWO COLOR PER LINE TELEVISION SYSTEMS
Filed March 30, 1966 3 Sheets-Sheet 1
FIG. 1
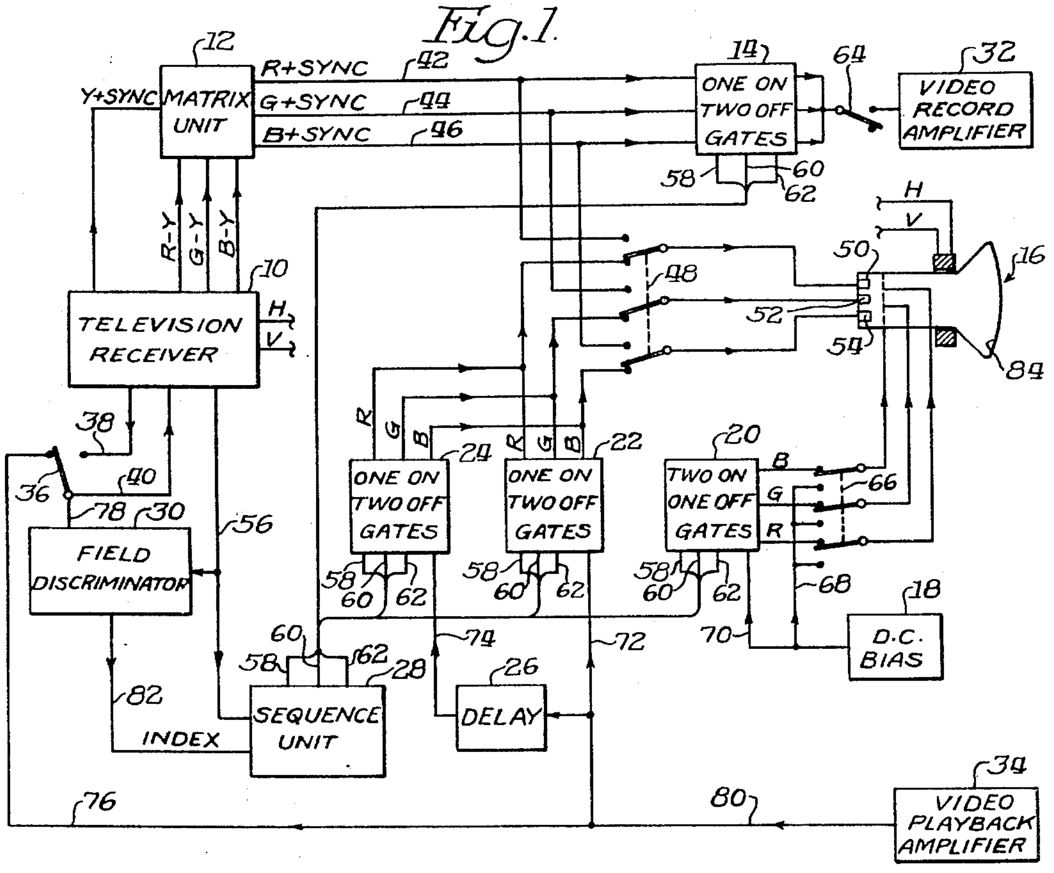
FIG. 2
| | SEQUENCE UNIT STATE | | |
|---|---|---|---|
| | 1 | 2 | 3 |
| GATES 14 | R | G | B |
| GATES 22 | R | G | B |
| GATES 24 | B | R | G |
| GATES 20 | BR | RG | GB |
FIG. 3
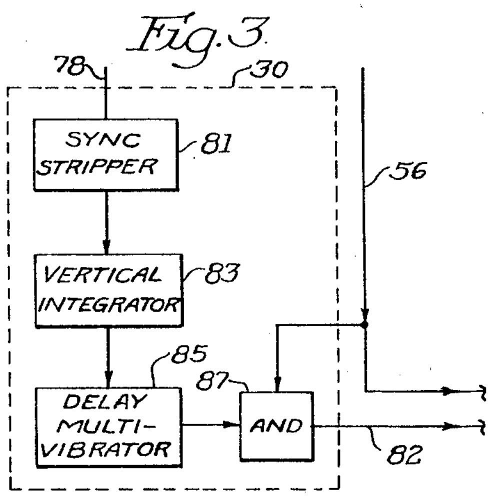
INVENTOR.
Edward G. Thurston
BY
Griffin and Branigan
Attys INVENTOR.
Edward G. Thurston
BY
Griffin and Branigan
Attys July 15, 1969 E. G. THURSTON 3,456,069

COLOR SYNCHRONIZATION FOR TWO COLOR PER LINE TELEVISION SYSTEMS

Filed March 30, 1966 3 Sheets-Sheet 3

INVENTOR.
Edward G. Thurston
BY
Griffin and Branigan
Attys

United States Patent Office 3,456,069
Patented July 15, 1969

3,456,069
COLOR SYNCHRONIZATION FOR TWO COLOR PER LINE TELEVISION SYSTEMS

Edward G. Thurston, Chicago, Ill., assignor to Bell & Howell Company, Chicago, Ill., a corporation of Illinois Filed Mar. 30, 1966, Ser. No. 538,816
Int. Cl. H04n 9/44
U.S. Cl. 178—5.4 9 Claims

ABSTRACT OF THE DISCLOSURE

In a three color display system wherein only two colors are displayed during each line scan interval a better color interlace, resulting in a finer line structure, is obtained by employing a specific relationship between the pairs of colors displayed during the first line scan intervals of the two fields of a frame. For a repeating sequence of color pairs AB, BC, CA, the best color interlace is obtained when the first line of each first field of a frame is displayed in any color pair of the sequence and the first line of each second field is displayed in the next succeeding color pair of the sequence.

The present invention relates to a method and apparatus for controlling the display sequence of a three-color video display system of the type wherein only two colors are displayed during each line scan interval of the display tube. More specifically, the present invention relates to a method and apparatus for controlling the sequence of color display in a two-color-per-line system so that an improved line structure and color pattern is obtained.

Copending application Ser. No. 538,815, filed concurrently herewith, discloses and claims a video display system wherein line sequential video signals representing first, second, and third colors are utilized to control the electron beam guns in a tri-color display tube so that each color is displayed during two successive line scan intervals and two colors are displayed during each line scan interval. The scanning of the display tube is conventional in that the display comprises a sequence of frames, each frame comprising first and second fields and each field comprising a plurality of horioznlal lines. The lines of the first and second fields are scanned in an interlaced pattern as is conventional with systems displaying NTSC color signals. However, it has been discovered that for any two-color-per-line system for displaying any three colors there are certain display sequences which provide a display wherein the line structure is at least twice as good as for other display sequences.

The basic principle of the invention may be better understood by considering a system for displaying any three colors A, B, and C, said system displaying two colors during each line scan interval. There are three possible combinations for displaying the three colors two at a time, i.e., AB, BC, and CA. Furthermore, there are three possible permutations or sequencies for displaying these combinations, i.e., AB, BC, CA, or AB, CA, BC, or BC, AC, AB. For any given display sequence starting with a first of the three combinations and continuing in a sequence second combination, third combination, first combination, etc. there is a unique relationship between the combinations displayed during the first line scan intervals of the first and second fields that gives better color interlace and line structure than any other relationship. Specifically, if the first combination of colors is displayed during the first line scan interval of each first field, then for the best color interlace the second combination of colors should be displayed during the first line scan interval of each second field. If the three combinations are displayed in any other sequence then there is a corresponding unique relationship between the combinations displayed during the first line scan intervals of the first and second fields which will produce a display having improved line structure.

Accordingly, an object of this invention is to provide a method and apparatus for giving an improved video display in a three-color system of the type wherein only two colors are displayed during each line scan interval.

An object of this invention is to provide a method and apparatus for controlling the display of first, second, and third color signals produced in a line sequential manner, said display being controlled such that only first and second colors are displayed during the first and succeeding third line scan intervals of each first field and the third and succeeding third line scan intervals of each second field, only second and third colors are displayed during the second and succeeding third line scan intervals of each first field and the first and succeeding third line scan intervals of each second field, and only third and first colors are displayed during the third and succeeding third line scan intervals of each first field and the second and succeeding third line scan intervals of each second field.

A further object of the invention is to provide a method and apparatus as described above wherein synchronizing signals supplied in synchronism with the line sequential signals are used to control the display of said color signals. The apparatus includes a three-state sequence unit for selectively gating two color signals to electron beam guns in a video display tube during each line scan interval. In accordance with the present invention the sequence unit is indexed or reset to a first state for the first line scan interval of each first field and/or to a second state for the first line scan interval of each second field. The means for indexing the sequence unit may take several forms, some of which are hereinafter described.

Other objects and advantages of the invention will become apparent upon consideration of the following description and the accompanying drawings wherein:

FIG. 1 is a block diagram of a system employing the present invention;

FIG. 2 is a chart showing one possible sequence of operation of certain gates in FIG. 1;

FIG. 3 shows one embodiment of a suitable field discriminator;

Figure 4:
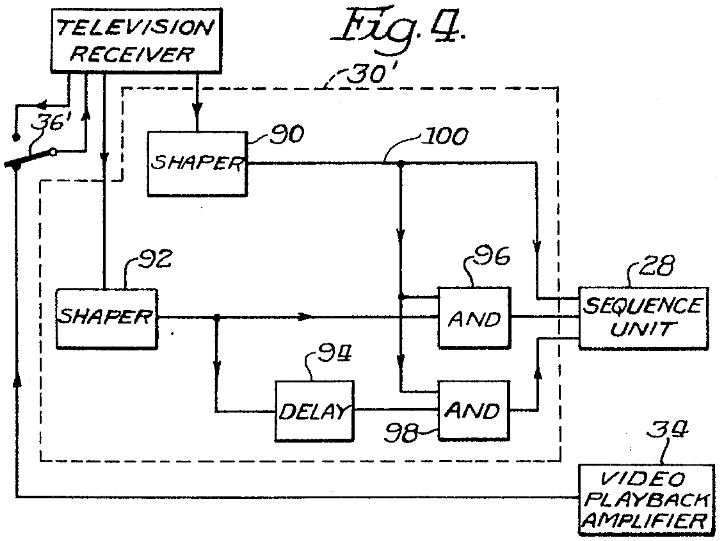
FIG. 4 shows another embodiment of a suitable field discriminator.

FIGS. 5A–F are diagrams illustrating the novel scanning method.

General description—FIGURE 1

The present invention is disclosed but not claimed in copending application Ser. No. 538,815 filed Mar. 30, 1966 and entitled "Two Color Display from Line Sequencing Recording." The advantages and novel aspects of the invention may be best understood by considering the invention in connection with a system such as that disclosed in the copending application and the operation of that system will now be described before considering the novel scanning method claimed herein.

The pertinent portions of the system are shown in block form in FIG. 1. The system includes a television receiver 10, a matrix unit 12, a set of record gates 14, a color display tube 16, a grid bias source 18, a set of bias control gates 20, first and second sets of playback display gates 22 and 24, a delay means 26, a sequence control unit 28, and a field discriminator means 30. The system also includes a video tape recorder but since the recorder may be any conventional video recorder and need have simply the capability of recording black and white video signals, only the video record and playback amplifiers 32 and 34 are shown in FIG. 1. The system also includes sound circuits which are not relevant to the present invention.

Television receiver 10 may be any conventional color television receiver responsive to NTSC color signals for producing a visual display on the face of the color display tube 16 associated therewith. The television receiver detects standard NTSC color signals and produces the color difference signals RY, GY, and BY as well as a composite luminance and sync signal, Y+sync. as explained in the above-mentioned copending application, the color difference outputs and the luminance output from receiver 10 are disconnected from the display tube and are connected instead to a matrix unit 12. The receiver is further modified by inserting a switch 36 between the leads 38 and 40. Lead 38 may, for example, be an output lead from the first video amplifier and the lead 40 is connected to a sync separator circuit. The sync separator separates the sync signals from the video signals and applies the sync signals to the horizontal and vertical deflection circuits of the receiver. When switch 36 connects leads 38 and 40, sync signals derived from the incoming NTSC signal control the horizontal and vertical deflection circuits in the receiver and the deflection circuits in turn produce the horizontal and vertical deflection voltages which control the scanning of the electron beams in tube 16.

It will be understood that video information is displayed on the face of display tube 16 in a sequence of frames, each frame comprising two fields and each field comprising a plurality of line scans, the lines of one field being interlaced with the lines of the next field. Furthermore, it will be understood that the usual vertical blanking interval occurs between the last line scan interval of one field and the first line scan interval of the next field.

In the following description it is important to note that when reference is made to "line scan interval," "horizontal line scan interval," or "scan interval" it is intended to mean a period of time during which one horizontal line is written or displayed on the face of the display tube. Equal intervals of time occurring during the vertical blanking interval are, on the other hand, referred to herein as "horizontal pulse periods." This distinction is made only to simplify the description, these "periods" or "intervals" being the same as in a conventional receiver for displaying NTSC color signals.

The matrix unit 12 combines the luminance+sync signal with each of the color difference signals to produce composite color and sync signals R+sync, G+sync, and B+sync, on the leads 42, 44, and 46, respectively. The red, green and blue signals appear simultaneously on leads 42, 44, and 46 and may be applied through a switch 48 to the red gun 50, the green gun 52, and the blue gun 54, of the display tube. The signals appearing on leads 42, 44, and 46 are also applied to the set of record gates 14. This set includes a red gate for receiving the signal R+sync, a green gate for receiving the signal G+sync, and a blue gate for receiving the signal B+sync. The gates 14 are further conditioned by output signals from the sequence unit 28.

The sequence unit 28 is a three state device and may, for example, be a three stage ring counter or shift register. The sequence unit is stepped from the first state to the second, from the second state to the third, and from the third state to the first in a repeating sequence by horizontal sync pulses appearing on lead 56. In each of its three states the sequence unit produces a unique combination of output signals on output leads 58, 60, and 62. These output signals are applied to the gates 14 as well as the gates 20, 22, and 24. The sync pulses may be derived from the horizontal deflection circuits of the television receiver, preferably the horizontal oscillator. The oscillator produces one sync pulse for each horizontal line scan interval as well as one sync pulse during each horizontal pulse period of the vertical blanking interval.

The signals on leads 58, 60, and 62 control the gates 14 so that one of the gates is always on and the other two gates are always off. For example, when the sequence unit 28 is in its first state the red gate 14 may be conditioned to pass the signal on lead 42 to the record switch 64. When the sequence unit is in its second state it conditions the green gate 14 to pass the signal on lead 44 through the gate to the record switch, and when the sequence unit is in its third state it conditions the blue gate 14 to pass the signal on lead 46 through to the record switch.

Since the sequence unit is stepped by pulses on lead 56 derived from the horizontal oscillator in the deflection circuits in the television receiver, it is stepped from one state to the next for each horizontal line scan of the electron beams in tube 16. Thus, during the interval of each horizontal line scan one of the gates 14 is conditioned to pass one of the color signals from line 42, 44, or 46 so that one color signal at a time passes through switch 64 to the video record amplifier 32. Stated differently, the signals on leads 42, 44, and 46 are recorded as line sequential signals in, for example, the sequence R+sync, G+sync, B+sync.

Switch 66 controls the application of the bias voltage from source 18 to the grids of the electron beam guns in tube 16. When set in the position opposite that shown in FIG. 1, switch 66 connects the grid bias voltage on lead 68 to the grids of the red, green and blue guns so that all three guns are continuously active for writing on the face of the display tube.

When the switch 66 is set to the position shown in FIG. 1, grid bias voltage is applied to only two grids during each horizontal line scan. The DC bias voltage is applied over lead 70 to the set of two-on, one-off gates 20. This set of gates comprises three gates designated red, green and blue. The bias voltage is applied to one input of each of these gates and each gate has an individual output connected to one of the contacts of switch 66. The red, green, and blue gates 20 are controlled by output signals from the sequence unit 28 so that two gates are always on and one gate is off. The DC bias voltage is applied to all three of the gates hence when the red gate 20 is turned on by the sequence unit the bias voltage is applied to the grid of the red gun to turn the gun on, when the green gate 20 is turned on by the sequence unit bias voltage is applied to the grid of the green gun, and when the blue gate 20 is on the bias voltage is applied to the grid of the blue gun. As shown in FIG. 2, the gates 20 are turned on in the sequence BR, RG, GB.

The two sets of gates 22 and 24 are like the gates 14 previously described. Each set of gates contains a red gate, a green gate and a blue gate. The gates are controlled so that only one gate in each set is on during any given horizontal line scan interval. However, the gate 22 which is on at any given time is not the same color gate as the gate 24 which is on. As illustrated in FIG. 2, when sequence unit 28 is in its first state it conditions red gate 22 and blue gate 24, when it is in its second state it conditions green gate 22 and red gate 24, and when it is in its third state it conditions blue gate 22 and green gate 24. Thus, the color designations of the gates 22 and 24 which are conditioned by the sequence unit during any horizontal line scan interval correspond to the color designations of the grids conditioned by the outputs of the gates 20.

Line sequential color signals recorded by the video tape recorder are played back through video playback amplifier 34 and applied over lead 80 and lead 72 to one input of each of the three gates 22. The output of the video amplifier is also applied to the delay means 26 which has its output connected by way of lead 74 to one input of each of the gates 24. The outputs of the red gates 22 and 24 are applied through switch 48 to the cathode of the red gun 50 of the display tube whereas the outputs of the green gates 22 and 24 are connected through switch 48 to the cathode of the green gun, and the outputs of the blue gates 22 and 24 are connected through switch 48 to the cathode of the blue gun.

As previously noted, the signals appearing on leads 42, 44, and 46 which are recorded by the video recorder comprise not only the color signals but also the sync signals associated therewith. During playback, these sync signals are used to control the scanning of the electron beams in display tube 16. The composite color and sync signals played back by the tape recorder are amplified by amplifier 34 and pass over leads 80 and 76 and switch 36 to lead 40. Lead 40 carries the composite color and sync signals into the receiver where the sync signals are separated from the video picture signals and used to control generation of the horizontal and vertical deflection voltages. The sync signals passing over lead 76 also pass through the switch 36 and lead 78 to the field discriminator 30. Various modifications of the field discriminator are hereinafter described. The function of this unit is to index the sequence unit to a first predetermined state at the beginning of a first field of each frame and, in some embodiments, to also index the sequence unit to a second predetermined state at the beginning of each second field.

Record mode—FIGURE 1

The system of FIG. 1 may operate in either the record mode or the playback mode. In the record mode, the switches 36, 48, 64, and 66 are all set to the position opposite that shown in FIG. 1. The system receives standard NTSC color signals and presents a visual display on display tube 16 while at the same time converting the signals to line sequential form and recording them for subsequent playback.

With the switch 36 connected to lead 38 the sync signals associated with the NTSC signal are used to control the horizontal and vertical deflection of the electron beams in the display tube. The television receiver converts the NTSC signals to the color difference signals and the luminance+sync signal and all of these signals are applied to the matrix unit 12. The matrix unit 12 simultaneously produces the color signals red, green, and blue on leads 42, 44, and 46 and these signals are applied through switch 48 to the electron guns of the display tube. During each line scan interval of the display tube, one of the signals on leads 42, 44 and 46 is sampled and the signal passes through switch 64 to the video record amplifier 32. For purposes of illustration, and as shown in FIG. 2, it is assumed that the signals on leads 42, 44, and 46 are sampled and recorded in the sequence RGB with the red signal being sampled during the time the first horizontal line of a frame is being scanned by the electron beams of the display tube, the green signal being sampled during the time the second line of a frame is being scanned, and the blue signal being sampled during the time the third line of a frame is being scanned.

It should be understood that the conventional sync pulses occurring during the vertical blanking interval of the display device also pass through gates 14 and are recorded by the recorder. The gates 14 are sequenced by sequence unit 28 throughout the vertical blanking interval so that the red, green, and blue gates continue to sample the signals on leads 42, 44, and 46. Since the sync signals are present simultaneously on each of these leads, the signals are sampled regardless of which gate is conditioned by the sequence unit. By employing fast switching gates and observing the relative timing between the switching of the gates and the occurrence of the sync pulses during the vertical blanking interval it is possible to switch the gates without losing the sync signals.

Playback mode

In the playback mode the device of FIG. 1 plays back the signals recorded during the record mode and displays the signals on the face of the display tube 16 with two colors being displayed during each horizontal line scan interval. In the playback mode all switches are set as shown in FIG. 1. This setting of switch 36 opens the connection between leads 38 and 40 so that the sync signals derived from any incoming NTSC signals cannot be applied to the deflection circuits. The setting of switch 48 prevents color signals produced at the output of the matrix unit from reaching the electron guns of the display tube. The setting of switch 64 disconnects the input of the recorder so that no signals are recorded during the playback mode. The setting of switch 66 breaks the direct connection between the DC bias source and the grids of the display tube and connects the grids to the outputs of the gates 20 so that only two grids are conditioned during each horizontal line scan interval.

The signals played back by the recorder are amplified by amplifier 34 and appear on lead 80. Assume that the sync signals recorded during the vertical blanking interval of the first field of a frame appear on lead 80. These signals are applied over lead 76, switch 36, and lead 40 to the deflection circuits in the television receiver to thereby control these circuits in the usual manner. The synchronizing signals are also applied to the field discriminator 30 which detects that a new frame is about to begin. The field discriminator produces an index pulse on lead 82 to reset the sequence unit to a predetermined state at some instant during this vertical blanking interval. Pulses on the lead 56 from the horizontal oscillator step the sequence unit once for each subsequent horizontal pulse period of the blanking interval so that the sequence unit is in state one (see FIG. 2) as the blanking interval ends and the first line sequential color signal appears on lead 80. In the assumed illustration this color signal represents the color red and it is applied to the delay means 26 and one input of each of the gates 22. As shown in FIG. 2, the red gate 22, the blue gate 24, and the red and blue gates 20 are all conditioned when the sequence unit is in state one. The red color signal is gated through red gate 22 and applied to the red gun 54 while the output of the red gate 20 conditions the grid of the red gun. Therefore, during this first line scan interval only the red electron gun is conditioned to write on the face of the display tube. Although the grid of the blue gun is conditioned by the sequence unit, the blue gun is not active because no color signal is applied to the blue gate 24. The delay means 26 delays the red color signal for the duration of one horizontal line scan so that the red color signal does not appear on lead 74 until the next following line scan interval.

At the end of the first line scan interval a horizontal sync pulse on lead 56 steps the sequence unit to its second state. The second color signal, assumed to be green, appears on lead 80 and is applied to each of the three gates 22. During this interval the red signal emerges from delay means 26 and is applied over lead 74 to one input of each of the gates 24. As shown in FIG. 2, the green gate 22, the red gate 24, and the red and green gates 20 are all conditioned when the sequence unit is in its second state. Therefore, the DC bias is gated through the red and green gates 20 to condition the grids of the red and green electron guns, the green signal on lead 72 passes through the green gate 22 and is applied to the green gun 52, and the red signal appearing on lead 74 is gated through red gate 24 and applied to the red gun 50. Therefore, during the second line scan interval of a frame the colors red and green are both written on the face of the display tube.

At the end of the second horizontal line scan interval another horizontal sync pulse appears on lead 56 to step the sequence unit to its third state. The blue color signal is played back by the tape recorder and is applied to delay line 26 and one input of each of the gates 22. During this horizontal line scan interval the green signal delayed at delay means 26 is applied to one input of each of the gates 24. As shown in FIG. 2, the blue gate 22, the green gate 24, and the blue and green gates 20 are all conditioned when the sequence unit is in state three. The outputs from the blue and green gates 20 condition the grids of the blue and green guns in the display tube. The blue signal is gated through the blue gate 22 and applied to the cathode of the blue gun 54. The green signal on lead 74 is gated through green gate 24 and applied to the green gun 52. Therefore, during the third horizontal line scan interval of a frame the colors blue and green are written on the face of the display tube.

At the beginning of the fourth horizontal line scan interval, a horizontal pulse on lead 56 steps the sequence unit 28 so that it again returns to state one. Another red color signal is played back by the recorder and is applied to delay means 26 and the gates 22. During this interval the blue signal which has been delayed in delay means 26 appears on lead 74 and is applied to the gates 24. The gates 20 again condition the grids of the red and blue electron guns. The red signal on lead 72 passes through red gate 22 and is applied to red gun 50 while the blue signal on lead 74 passes through the blue gate 24 and is applied to the blue gun 54. Therefore, during the fourth horizontal line scan interval blue and red colors are written on the face of the display tube.

At this point it should be obvious that the video signals played back by the recorder are displayed two colors per line in a repetitive sequence once a first line has been displayed in two colors. The first line in which two colors are displayed is preceded by a single line in which only one color is displayed. That is, although the grids of two guns are conditioned during each and every line scan interval, only one color is displayed during the first horizontal line scan interval of a field with two colors being displayed during every other line scan interval. It will also be obvious that the display sequence need not start with red, nor does the sequence need to be RG, GB, BR, but may, for example, be BG, GR, RB. However, if the display sequence is changed, the recording sequence must be changed accordingly or the color signals, on playback, will be applied to the wrong color gun.

Field discriminator—FIGURE 3

It will be appreciated that if the sequence unit 28 should fail to step from one state to the next before each horizontal line scan then the color registration of the device would be lost. For example, if the sequence unit 28 should fail to respond to a single horizontal pulse on lead 56 then the red color signals played back by the recorder and appearing on lead 80 would be gated through the blue gates 22 and 24 to the blue gun of the display tube. In like manner, the green color signals would be gated through the red gates 22 and 24 to activate the red gun while the blue signals on lead 80 gated through the green gates 22 and 24 to activate the green gun. The purpose of the field discriminator 30 is to set the sequence unit 28 to an initial state at least once each frame, to thereby restore the proper sequencing if it has been lost. As subsequently described, the sequence unit may be set either once each frame or at the beginning of each of the two fields within a frame. Thus, the field discriminator insures that the sequence unit is restored to proper sequence at least at the beginning of each frame.

The field discriminator may take any one of several forms, one of which is shown in FIG. 3. In this embodiment the discriminator comprises a sync stripper 81, an integrator 83, a delay means 85, and a logical AND circuit 87.

It is well known that a vertical blanking interval follows the last horizontal line scan interval of each field and that during this interval equalizing pulses, vertical sync pulses, and horizontal sync pulses are produced. All of these pulses are recorded when the device of FIG. 1 is operating in the record mode and are also applied over lead 78 to the sync stripper 81. Since the sync pulses are recorded, they are available and are played back through amplifier 34 when the device is operating in the playback mode. Therefore, regardless of whether the device is operating in the record mode or the playback mode the sync signals occurring during the vertical blanking interval are available at the input to sync stripper 81. The sync stripper blocks the video picture signals and applies only sync signals to the integrator 83. The integrator integrates the vertical sync signals and produces an output pulse which is applied to a delay means such as delay multivibrator 85.

The operation of the field discriminator is based on the fact that the elapsed time between the vertical sync pulse and the subsequent horizontal sync pulses is different for the first field of a frame than for the second field.

The delay of multivibrator 85 is chosen such that it responds to the output pulse of integrator 83 to produce an output pulse which coincides in time with any one of the horizontal sync pulses produced during the latter part of the vertical blanking interval of one of the fields of a frame. This may be either field but for purposes of this explanation it is assumed to be the first field of each frame.

The output of multivibrator 85 is applied to one input of AND circuit 87 which also receives horizontal sync pulses over lead 56. Upon coincidence of signals applied to the AND circuit from the multivibrator and lead 56, the AND circuit produces an index pulse on lead 82 which sets the sequence unit 28 to a predetermined state.

It should be noted that the index pulse need not necessarily set the sequence unit to its first state. There are several horizontal synch pulses during the latter part of each vertical blanking interval. The delay of the multivibrator 85 may be adjusted so that its output coincides with the occurrence of any one of these horizontal sync pulses during the vertical blanking interval of the first field of a frame. This will cause the AND circuit to produce an index pulse to set the sequence unit to some predetermined state. During the subsequent horizontal pulse periods the succeeding horizontal sync pulses occurring on lead 56 during the remainder of the blanking interval step the sequence unit to succeeding states. Accordingly, it is seen that the state to which the sequence unit should be indexed by the output of the AND circuit is determined by which horizontal sync pulse is selected for coincidence. The only requirement is that, for the specific record and display sequence represented by FIG. 2, the sequence unit 28 is stepped to its first state for the first line scan interval of the first field in each frame.

It may be noted that if the index pulse on lead 82 and the horizontal sync pulses on lead 56 set the sequence unit 28 to its first state for the first line of the first field of each frame, then the number of pulses on line 56 is just sufficient to step the sequence unit to its second state just prior to the display of the first line of the second field of the frame. As subsequently explained, it is this feature which provides an improved interlace pattern resulting in a narrow "line structure" in the display.

Field discriminator—FIGURE 4

The discriminator 30 of FIG. 3 provides an indexing pulse to index the sequence unit 28 once every frame. However, indexing may be accomplished twice every frame or once every field provided the sequence unit is indexed to its first state at the beganning of one field and indexed to a second state at the beginning of the next field. The reason for this requirement will become apparent when the novel method of scanning is described in connection with FIGS. 5A–5E.

The discriminator 30′ of FIG. 4 may be employed when it is desired to index the sequence unit at the start of every field. The discriminator includes a horizontal pulse shaper 90, a vertical pulse shaper 92, a delay means 94 and a pair of AND circuits 96 and 98. A switch 36′ performs the function of applying the incoming NTSC signals to the sync circuits of the receiver during the record mode and applying the playback signals to these same circuits during the playback mode.

Horizontal shaper 90 receives horizontal sync signals derived from the horizontal oscillator in the receiver whereas the vertical shaper 92 receives vertical sync signals derived from the vertical oscillator. The shaper 90 responds to each horizontal sync signal by producing a trigger pulse of very short (i.e. 1–2 $\mu$sec.) duration. These trigger pulses are applied to the sequence unit 28 to step the unit from one state to the next for each line scan interval and horizontal pulse period. The trigger pulses are also applied to one input of each of the AND circuits 96 and 98.

The shaper 92 responds to each vertical sync signal by producing an output pulse which has a duration of approximately one-third the horizontal line scan interval. The output of the shaper 92 is applied directly to AND circuit 96 and is also applied through the delay means 94 to the AND circuit 98. Delay means 94 delays the signal applied thereto for an interval of time equal to one-half the horizontal line scan interval.

The vertical sync pulse output from shaper 92 coincides with a horizontal sync pulse output from shaper 90 during the blanking interval of the first field of each frame. This coincidence is detected by AND circuit 96 which produces an output signal to set sequence unit 28 to a first state. The sequence unit is then advanced one step by each trigger pulse.

During the vertical blanking interval of the second field of a frame the shaper 92 produces an output signal which occurs midway between the occurrence of two horizontal pulses. The output signal from the shaper 92 is delayed in delay means 94 so that it is applied to AND circuit 98 in coincidence with a trigger pulse on lead 100. The AND circuit produces an output signal to set the sequence unit to a second state after which the sequence unit is again stepped once for each trigger pulse from shaper 90.

Scanning method—FIGURES 5A–5F

In accordance with the present invention, the display tube 16 is operated in a novel manner to obtain a display having an improved line structure. The advantages of this novel method of operating display tube 16 will be better understood upon consideration of FIGS. 5A–5F.

Figure 5A:
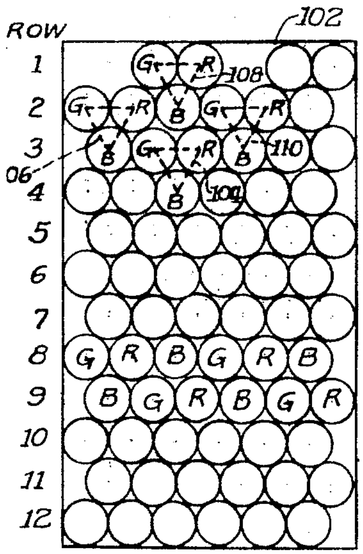

The display tube 16 may be either a conventional cathode ray tube of the shadow mask variety, or it may be a Chromatron tube having characteristics as subsequently described. FIG. 5A shows a section 102 of the target surface of a typical shadow mask tube. Disposed on the target surface are a plurality of groups of elemental areas or phosphor dots with the dots being arranged in horizontal rows. Each group of dots contains three dots, each dot having a different color response characteristic. For example, the dots may produce the colors red, green, and blue when activated by the scanning electron beams of the guns.

The dots are arranged in a conventional manner with the dots of each group being arranged triangularly. Four groups 104, 106, 108, and 110 are indicated by triangles formed by lines connecting the centers of the dots in each group.

It is well known that the shadow mask tube includes a mask disposed between the electron guns and the target surface. The mask contains a plurality of apertures, one for each group of dots. The apertures are positioned such that all three electron beams may pass through an aperture to energize respectively the three dots in the group associated with that aperture.

Figure 5B:
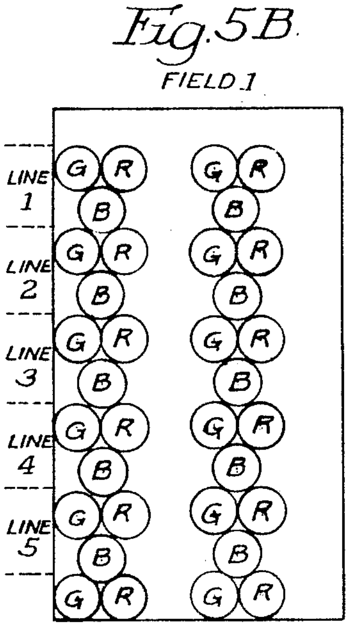
Figure 5C:
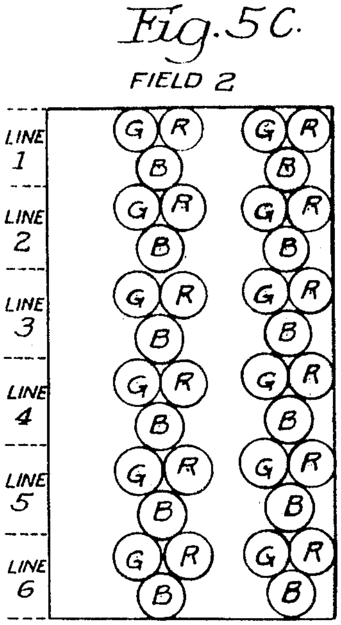

In a conventional three color display it has been the usual practice to activate all three electron guns of the shadow mask tube during every line scan. Furthermore, the apertures are arranged such that one-half of the apertures are scanned during the first field of each frame whereas the other half of the apertures are scanned during the second field of each frame. FIGS. 5B and 5C show the phosphor dots which are scanned during the first and second fields, respectively, when the tube is operated in a conventional manner with all three colors being displayed during each line scan. When this mode of display is employed the "line structure" of the display is determined solely by the size of the dots since each dot is scanned once each frame.

As taught in the above-mentioned copending application, and as described above with reference to the playback mode of operation of FIG. 1, line sequential color video signals may be displayed with only two colors being displayed during each horizontal line scan interval. It has been found that in this case the "line structure" varies greatly depending on the relationship between the scan sequences used in the first and second fields of a frame. More specifically, it has been found that the line structure, which is determined by the color interlace pattern, varies greatly depending upon the starting point of the sequence for the first and second fields, assuming the same repetitive sequence is used in both fields. Generally speaking, the rule for proper color interlace resulting in the finest line structure may be stated as follows. Assuming a display surface for displaying any three primary colors A, B, and C, and assuming that two colors are displayed during each horizontal line scan in a repeating sequence of the three possible combinations AB, BC, CA, then for the best color interlace the first line of each first field should be displayed in the two colors of any one of the combinations of the sequence and the first line of the second field should be displayed in the two colors of the next combination of the sequence. For example, if the colors are displayed in the sequence AB, BC, CA, and if the line of the first field is displayed in the colors AB, then the first line of the second field should be displayed in the colors BC.

Figure 5F:
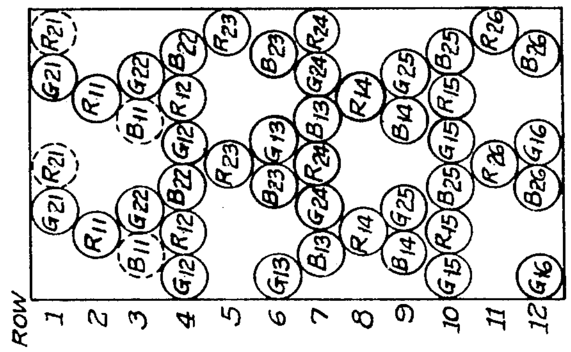
Figure 5E:
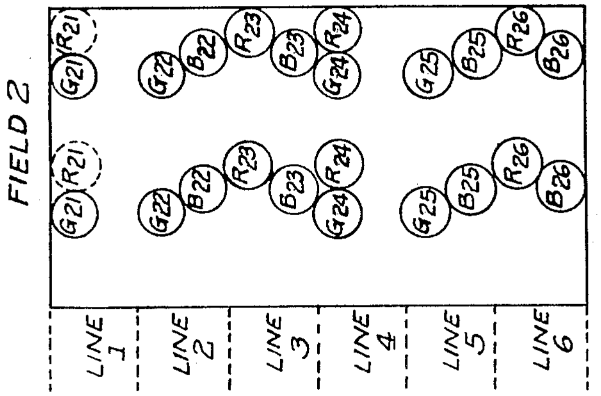
Figure 5D:
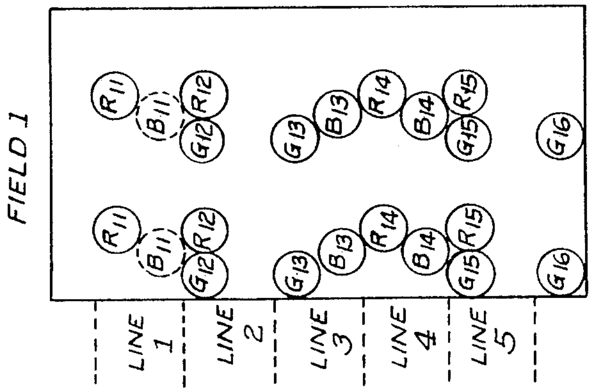

FIG. 5D is similar to FIG. 5B but illustrates the display obtained during a first field when only two colors per line are displayed and the display tube is operated in accordance with the display sequence of the present method. FIG. 5D is drawn for the specific arrangement where the line sequential color signals to be displayed occur in the sequence R, G, B, with the red color signal occurring during the first line scan interval of the first field of a frame. As described above in the section entitled Playback Mode, only the color red is written during the first line scan interval of the first field. In FIG. 5D, this is indicated by the dots referenced $R_{11}$ where R represents the color red, the first subscript numeral represents the field, and the second subscript numeral represents the number of the line scan within the field. Although the blue gun is conditioned during the first line scan interval of each first field, there is no blue color signal available for display hence the blue dots $B_{11}$ are shown in phantom outline.

As further described in connection with the playback mode, the colors red and green are written during the second line scan of the first field and the dots scanned during the second line are indicated by the reference characters $R_{12}$ and $G_{12}$. During the third line scan the dots $G_{13}$ and $B_{13}$ are scanned, and during the fourth line scan the dots $B_{14}$ and $R_{14}$ are scanned. The sequence continues until all lines of the first field have been scanned.

In the assumed example, the blue and red guns were conditioned during the first scan of the first field. Therefore, in accordance with the novel method of this invention, the red and green guns must be conditioned during the first scan of the second field. However, like the first line of the first field, there is only one color actually displayed during the first line scan of the second field. For the assumed example, this color has to be green since the first color for the first field was red. FIG. 5E shows the dots scanned during the second field of each frame. The green dots scanned during the first line scan of the second field are indicated by the reference character $G_{21}$ whereas the red dots $R_{21}$ which are scanned but not displayed are indicated in phantom outline.

Continuing with the scan sequence of the second field, the colors green and blue ($G_{22}$ and $B_{22}$) are displayed during the second line scan, the colors blue and red ($B_{23}$ and $R_{23}$) are displayed during the third line scan, the colors red and green ($R_{24}$ and $G_{24}$) are displayed during the fourth line scan, and so forth.

FIG. 5F is a composite diagram of FIGS. 5D and 5E and illustrates the display pattern for one complete frame. Inspection of FIG. 5F shows that for a complete frame the display pattern is repeated every third row of dots which is equivalent to one and one-half line scans. Furthermore, all three colors are displayed every third row. For example, over one complete frame the red, green, and blue dots are all scanned for the fourth, seventh, tenth, and every succeeding third row of dots.

Where the colors to be displayed during the first line scan of the first field and second field are red and green, respectively, the display sequence described above is unique in that it is the only display sequence which produces a pattern that repeats every one and one-half lines. If the display sequence is such that the dots scanned during the first lines of the first and second fields are red-green and red-green respectively, red-green and blue-red, respectively, blue-red and green-blue respectively, or any other sequence, then the resulting display will result in a pattern that repeats no less than every six rows or every three lines. This may be proved by plotting a display similar to that of FIG. 5F. Thus, for any other display sequence the resulting display has a line structure which is at least twice as coarse as that obtained when displaying in accordance with the present invention. However, for emphasis it is again pointed out that if the sequence in which the pairs of colors are made available is changed then the pairs of colors displayed during the first lines of the first and second fields must also be changed.

For purposes of illustrating the novel method and apparatus FIG. 5F shows the elemental areas or dots which would be scanned during the first few lines scan intervals of both fields of a frame. However, it will be understood that in actual practice one or more of these lines may not be visible to the viewer of the display because of mechanical masking and vertical height and linearity adjustment which varies from one display device to another. Thus, as used herein, the term "first line displayed" does not necessarily refer to the first line visible to the viewer.

FIGS. 5A–5F have, for the sake of simplicity, described the novel scanning method as applied to a cathode ray tube of the shadow mask variety. However, the method is equally applicable to other color display devices having a display surface made up of elemental areas having first, second, and third color response characteristics. For example, Chromatron tubes may be used having closely spaced vertical stripes of first, second, and third color response charactertistics on the face of the tubes. The electron beam generating means may be controlled to scan every third stripe during a particular horizontal line scan interval with the line scans effectively dividing each of the stripes into elemental areas.

Other modifications of the invention will be apparent to those skilled in the art. It is intended therefore to be limited only by the scope of the appended claims.

The embodiments of the invention in which an exclusive property or privilege is claimed are defined as follows:

1. The method of operating a color display device of the type including a display surface having elemental areas with first, second, and third color response characteristics, electron beam generating means for scanning said elemental areas in a sequence of frames, each frame comprising first and second fields and each field comprising a plurality of line scan intervals, said device further comprising means responsive to line sequential video color signals representing first, second, and third colors for activating said electron beam generating means whereby each color signal is displayed during two successive line scan intervals and two consecutively occurring line sequential color signals are displayed during each line scan interval, said method comprising the steps of:

applying line sequential color representing first, second, and third color signals to said electron beam activating means, and controlling said electron beam activating means whereby only said first and second color signals are applied during a first and succeeding third line scan intervals of each first field and a third and succeeding third line scan intervals of each second field, only said second and third color signals are applied during a second and succeeding third line scan intervals of each first field and a first and succeeding third line scan intervals of each second field, and only said third and first color signals are applied during a third and succeeding third line scan intervals of each first field and a second and succeeding third line scan intervals of each second field.

2. The method of operating a color display tube having a display surface comprising a plurality of elemental areas arranged in lines and having first, second, and third color response characteristics, electron beam generating means, and scan control means for deflecting generated electron beams to scan said lines of elemental areas during a succession of frames, each frame comprising interlaced first and second fields, each of said fields comprising a plurality of line scan intervals, said method comprising the steps of:

producing line sequental color signals representing said first, second, and third colors during the first field of each frame by producing said color signals in a repetitive sequence with said first color signals being produced during a first and succeeding third line scan intervals of each first field, said second color signals being produced during a second and succeeding third line scan intervals of each first field, and said third color signals being produced during a third and succeeding third line scan intervals of each first field, applying said line sequential color signals to said electron beam generating means two colors at a time in a sequence whereby only said first and second colors are displayed during a first and succeeding third line scan intervals of each first field, only said second and third colors are displayed during a second and succeeding third line scan intervals of each first field, and only said third and first colors are displayed during a third and succeeding third line scan intervals of each first field, producing line sequential color signals representing said first, second, and third colors during the second field of each frame, and applying the line sequential color signals produced during each second field to said electron beam generating means two colors at a time in a sequence whereby only said second and third colors are displayed during a first and succeeding third line scan intervals of each second field, only said third and first colors are displayed during a second and succeeding third line scan intervals of each second field, and only said first and second colors are displayed during a third and succeeding third line scan intervals of each second field.

3. The method as claimed in claim 2 and further comprising the step of applying signals to said deflection means whereby said electron beams scan alternate lines of said elemental areas during each first field and the other lines of said elemental areas during each second field.

4. The method as claimed in claim 3 wherein:

each of said line sequential color signals is applied to said electron beam generating means as it is produced, and is delayed for a period of time equal to one line scan interval and again applied to said electron beam generating means whereby each line sequential color signal is applied to said electron beam generating means and the color displayed during two consecutive line scan intervals.

5. A video display means comprising a display device including:

a display surface comprising a plurality of elemental areas having first, second, and third color response characteristics, said elemental areas being arranged in a plurality of scanning lines, first, second, and third electron gun means for generating first, second and third electron beams, scan control means for controlling said electron beams to scan said lines of elemental areas in a sequence of frames each comprising first and second fields, said scan control means controlling said electron beams to scan alternate lines of said elemental areas during a plurality of line scan intervals comprising each first field and the remainder of said lines during a plurality of line scan intervals comprising each second field, and controlling said first electron beam to scan said areas having said first color response characteristic, said second electron beam to scan said areas having said second color response characteristic, and said third electron beam to scan said areas having said third color response charteristic, a source of line sequential video signals representing said first, second, and third colors, said source producing said first color signals during ing a first and succeeding third line scan intervals of each first field and during a third and succeeding third line scan intervals of each second field, said second color signals during a second and succeeding third line scan intervals of each first field and during a first and succeeding third line scan intervals of each second field, and said third color signals during a third and succeeding third line scan intervals of each first field and during a second and succeeding third line scan intervals of each second field, first gating means responsive to said source for selectively applying said first, second, and third color signals to said first, second, and third electron gun means, respectively, means, including delay means and a second gating means, responsive to said source for selectively applying said first, second, and third color signals to said first, second, and third electron gun means, respectively, said delay means delaying each color signal applied thereto for a period of time equal to one line scan interval, sequence control means for selectively controlling said first and second gating means to apply said first, second, and third color signals from said source to said electron gun means, said sequence control means having a first state for controlling said first gating means to apply said first color signals to said first electron beam gun and said second gating means to apply said third color signals to said third electron beam gun, a second state for controlling said first gating means to apply said second color signals to said second electron beam gun and said second gating means to apply said first color signals to said first electron beam gun, and a third state for controlling said first gating means to apply said third color signals to said third electron beam gun and said second gating means to apply said second color signals to said second electron beam gun, means for sequencing said control means from one of said states to the next for each line scan interval, and means for setting said sequence control means to said first state for the first line scan interval of each first field.

6. A video display means as claimed in claim 5 wherein said source of line sequential color signals also produces video sync signals, said video display means further comprising:

means responsive to said video sync signals for controlling said setting means and said scan control means.

7. A video display means as claimed in claim 5 wherein said source of line sequential color signals also produces video sync signals, said video display means further comprising:

means for applying said video sync signals to said scan control means, means responsive to said scan control circuits for applying first signals to said setting means and said sequence unit, and means responsive to said scan control circuits for applying second signals to said setting means.

8. A video display means as claimed in claim 7 wherein said setting means comprises:

first and second logical AND circuits responsive to said first signals, means for applying said second signals to said first AND circuit without delay and to said second AND circuit with a delay equivalent to one-half a line scan interval, and, means connecting said first and second AND circuits to said sequence means whereby the output of one of said AND circuits sets said sequence unit to said first state and the output of the other said AND circuits sets said sequence unit to said second state.

9. In a color television system wherein one frame comprises two interlaced fields and each field comprises a plurality of horizontal line scans, the method of displaying a scene in the colors A, B and C, said method comprising the steps of:

displaying only the colors A and B during the first and succeeding third line scans of each first field of a frame, displaying only the colors B and C during the second and succeeding third line scans of each first field of a frame, displaying only the colors C and A during the third and succeeding third line scans of each first field of a frame, displaying only the colors B and C during the first and succeeding third line scans of each second field of a frame, displaying only the colors C and A during the second and succeeding third line scans of each second field of a frame, and, displaying only the colors A and B during the third and succeeding third line scans of each second field of a frame.

References Cited

UNITED STATES PATENTS

| | | | |
|---|---|---|---|
| 2,678,351 | 5/1954 | Schroeder | 178—69.5 |
| 2,698,355 | 12/1954 | Sleeper | 178—5.4 |
| 2,747,013 | 5/1956 | Sleeper, et al. | 178—5.4 |
| 2,940,005 | 6/1960 | Toulon | 178—5.4 |

RICHARD MURRAY, Primary Examiner

J. MARTIN, Assistant Examiner